(12) United States Patent
Mouton et al.

(10) Patent No.: US 8,151,055 B2
(45) Date of Patent: Apr. 3, 2012

(54) CACHE ACCESSING USING A MICRO TAG

(75) Inventors: Louis-Marie Vincent Mouton, Vallauris (FR); Nicolas Jean Phillippe Huot, Valbonne (FR); Gilles Eric Grandou, Tourrettes sur Loup (FR); Stephane Eric Sebastian Brochier, Chateauneuf de Grasse (FR)

(73) Assignee: ARM Limited, Cambridge (GB)

( * ) Notice: Subject to any disclaimer, the term of this patent is extended or adjusted under 35 U.S.C. 154(b) by 550 days.

(21) Appl. No.: 12/379,615

(22) Filed: Feb. 25, 2009

(65) Prior Publication Data

US 2009/0235029 A1    Sep. 17, 2009

(30) Foreign Application Priority Data

Mar. 12, 2008   (GB) ................................ 0804597.3

(51) Int. Cl.
*G06F 12/00* (2006.01)
(52) U.S. Cl. ............... 711/128; 711/137; 711/E12.001; 711/E12.018; 711/E12.057
(58) Field of Classification Search .................. 711/128, 711/137, E12.001, E12.018, E12.057
See application file for complete search history.

(56) References Cited

U.S. PATENT DOCUMENTS

| | | | |
|---|---|---|---|
| 4,682,281 A | | 7/1987 | Woffinden et al. |
| 4,977,498 A | * | 12/1990 | Rastegar et al. ............ 711/128 |
| 5,237,666 A | * | 8/1993 | Suzuki et al. ................ 712/240 |
| 5,506,976 A | * | 4/1996 | Jaggar ........................... 712/238 |
| 5,530,833 A | * | 6/1996 | Iyengar et al. ................ 711/128 |
| 5,724,547 A | * | 3/1998 | Iyengar et al. ................ 711/128 |
| 5,822,574 A | * | 10/1998 | Tran ............................... 712/233 |
| 2003/0005230 A1 | | 1/2003 | Solomon et al. |

FOREIGN PATENT DOCUMENTS

WO    WO 99/32980    7/1999

OTHER PUBLICATIONS

UK Search Report dated Jul. 30, 2008 for GB 0804597.3.

* cited by examiner

*Primary Examiner* — Kevin Ellis
*Assistant Examiner* — Mehdi Namazi
(74) *Attorney, Agent, or Firm* — Nixon & Vanderhye P.C.

(57) ABSTRACT

A data processing apparatus includes a data processor, and a data store for storing a plurality of identifiers identifying a cache way in which a corresponding value from a set associative cache is stored. The plurality of identifiers corresponding to a plurality of values stored in consecutive addresses such that a data store stores identifiers for values stored in a region of said memory. Included is a current pointer store for pointing to a most recently accessed storage location in said data store and circuitry to determine an offset of an address of said cache access request to an immediately preceding cache access request. Lookup circuitry determines if said pointer is pointing to an address within said region and said data processor identifies said cache way from said stored identifier pointed to by said current pointer if it has a valid indicator associated therewith.

20 Claims, 8 Drawing Sheets

CACHE ACCESSING USING A MICRO TAG

BACKGROUND OF THE INVENTION

1. Field of the Invention

The present invention relates to accessing a cache using a micro tag.

2. Description of the Prior Art

Caches are used within data processing apparatus to store increasingly large amounts of data. The storage of a large amount of data can make accessing the data within the cache quite a complicated procedure which requires addresses of a relatively large size. Manipulation of such addresses can therefore require significant amounts of power and time. Caches have been organised in a number of ways in order to reduce power and time overheads involved in accessing storage locations within them.

One popular way of configuring a cache is the so-called 'set associative' cache. A 16 Kbyte set associative cache is shown in FIG. 1. The cache shown is such a 4-way set associative cache 10 having 4 ways 11, 12, 13, 14 each containing a number of cache lines 20. A data value (in the following examples, a word) associated with a particular address 35 can be stored in a particular cache line of any of the 4 ways (i.e. each set has 4 cache lines, as illustrated generally by reference numeral 22). Each way stores 4 Kbytes (16 Kbyte cache/4 ways). If each cache line stores eight 32-bit words then there are 32 bytes/cache line (8 words×4 bytes/word) and 128 cache lines in each way ((4 Kbytes/way)/(32 bytes/cache line)). Hence, in this illustrative example, the total number of sets would be equal to 128, i.e. 'M' in the figure would be 127.

In order to address data stored in this sort of a cache an address 35 comprising a SET or index portion 37, which indicates which of the sets or lines the address is referring to and a TAG portion 36 indicating which of the four ways it is in is used. Such an address identifies a cache line and a cache way. The line being identified by the set and a comparison and match of TAGs stored in 4 TAG RAMs 25 with the TAGs in the corresponding set of the 4 caches 10 indicating the way. In reality more than one data word may be stored in a cache line within a cache way and thus, the address may contain further information.

When accessing data stored in a cache organised in this way, any virtual address produced by a programming model will need to be converted to a physical address. This can slow the procedure, as the program will produce the virtual address early, but the data cannot be accessed until it is converted to a physical address.

A known way of converting a virtual address to a physical address is by the use of a translation lookaside buffer or TLB. FIG. 2 shows a known way of accessing data during which a virtual address is converted to a physical address, the physical address then being used to access the data. The physical address 35 comprises a tag portion 36 and an index portion 37. The index portion is used to indicate which set within the cache ways the address refers to. Thus, a corresponding line within the plurality of cache tag directories 40 is selected using the index portion of address 35. The tag portion 36 of address 35 is then compared in comparator 60 with the four tags stored in each of the four cache tag directories that correspond to the four ways of the cache. When a comparison gives a match this indicates the cache way storing the data item and this data item can then be accessed from cache 50 using multiplexer 70.

This is one way in which data identified by a virtual address can be accessed. The initial step in this procedure is conversion of the virtual address to a physical address using a table lookaside buffer. This is not a fast step and thus, having this as the first step in the procedure considerably slows the critical path. An alternative to this is shown in FIG. 3. This system is referred to as a virtually indexed/physically tagged cache system. In this example the data access is performed using the virtual index to select which set (or line) the tag will be stored in. Thus, as soon as the virtual address is available this step can be performed in parallel with the conversion of the virtual address to a physical address using the TLB 30. Once the physical tag has been produced by the TLB 30 this is compared with the four tags selected from the cache tag directory by the index. When a match is found then this is used to access the data from the cache 50.

This is faster than the data access shown in FIG. 2. However, tags can be relatively long pieces of data, for example a memory system which has a 32K 4-way set-associative cache structure (consisting of 64 byte cache line size), would have tags of 19 bits (for a processor with 32-bit addresses). Thus, the comparison stage can be slow.

Furthermore, this process requires the accessing of multiple RAMs i.e. multiple cache tag directories and cache data arrays (RAMs) are accessed during the procedure and power consumption is therefore high.

One known way of addressing the issue of always having to access multiple RAMS is to use microtags. Microtags are used to store information regarding the cache way of recent cache accesses. These are particularly useful in instruction cache accesses. This is because as instructions are often processed in loops the same instruction may be accessed multiple times in close succession. Once a cache access has been made it is known which cache way the location accessed is in, and thus, storing information on recent cache accesses in the form of microtags can help reduce the number of times the multiple RAMS need to be enabled. However, in order to be able to associate a cache access request with a previous access substantially the full address of the cache line needs to be stored along with the information on the cache way. An address is often 32 bits long while the information on the cache way is generally only a few bits, depending on the number of ways to be identified. Thus, this solution is expensive in storage particularly if cache access information for several recent cache accesses is stored.

SUMMARY OF THE INVENTION

A first aspect of the present invention provides a data processing apparatus said data processing apparatus comprising: at least one data processor for processing data; a set associative cache for storing a plurality of values to be processed by said data processor, each value being identified by an address of a memory location within a memory storing said value, said set associative cache being divided into a plurality of cache ways; a data store comprising a plurality of storage locations for storing a plurality of identifiers, each identifier identifying a cache way that a corresponding value from said set associative cache is stored in and each having a valid indicator associated therewith, said plurality of identifiers corresponding to a plurality of values, said plurality of values being values stored in consecutive addresses such that said data store stores identifiers for values stored in a region of said memory; a current pointer store for storing a current pointer pointing to a most recently accessed storage location in said data store; offset determining circuitry responsive to a cache access request to determine an offset of an address of said cache access request to an immediately preceding cache access request, said offset determining circuitry being adapted to update said current pointer by said offset amount;

and data store lookup circuitry for determining from a size of said data store and said offset if said updated current pointer is pointing to an address within said region and if so said data processor is adapted to identify said cache way from said stored identifier pointed to by said current pointer if it has a valid indicator associated with it.

The present invention recognises the fact that although the information that is needed to identify a cache way that a particular value is stored in is small as there are generally only a few cache ways to discriminate between, the information needed to identify the cache line is large and thus, an important amount of logic is required for each of the entries storing the cache way information in order to be able to identify which entry is relevant for a particular cache line. The present invention also recognises that although most data stores storing this information typically store information relating to the most recently accessed addresses as these are most likely to be accessed again, in many circumstances accesses are performed to a particular region of memory during a particular period of time. Thus, were the data store storing the cache way information to be made to store not the most recently accessed cache addresses but values relating to a particular region of memory in which a recently accessed cache address is located then accesses could be performed without the need to identify each location using the cache line address. In particular, by storing in the data store values relating to consecutive addresses then the required entry can be determined simply from an offset to the previous access. A current pointer could then be moved by that offset amount, and provided the current pointer did not move out of the address region covered by the data store it would point to the new entry. This has the advantage of requiring only a few bits to determine a new entry location and thus, more entry locations could be provided and a larger memory region covered by the data store for a similar amount of logic. This could increase the efficiency of the system and significantly reduce the number of TAG RAM lookups required when there is no entry in the microtag.

Although the apparatus can determine whether or not a current pointer is updated to be outside of the region in a number of ways, in some embodiments said data processing apparatus further comprises a region locator pointer store for storing a region locator pointer pointing to an entry in said data store corresponding to a predetermined position within said region of consecutive addresses; wherein said data store lookup circuitry is adapted to determine if said updated current pointer is pointing to an address within said region from a value of said current pointer relative to said region locator pointer.

By using a region locator pointer that points to a particular entry in the data store corresponding to a particular position the apparatus can determine whether the current pointer is pointing to a location inside the address region covered simply by comparing it with the region location pointer.

Although the region locator pointer can point to any storage location in the data store, in some embodiments it points to a value having a lowest address. In such an embodiment it is called a bottom pointer and this is a simple way of knowing whether the current pointer is within the region or not. If the data store covers n address locations then if the current pointer goes to a value above the bottom pointer +n then it is outside of the region.

In some embodiments, said data store lookup circuitry comprises a comparator for comparing said updated current pointer and said region locator pointer and for determining whether said updated current pointer is outside of said region in response to said comparison.

A simple way of determining if the updated current pointer has moved outside of the region is to compare it with the region locator pointer.

In some embodiments, said data processing apparatus further comprises data store updating circuitry, said data store updating circuitry being responsive to receipt of an indication from said data store lookup circuitry that said updated current pointer is outside said region to update said region locator pointer by said offset amount such that said region is moved by said offset amount and to invalidate said storage locations corresponding to addresses no longer within said region.

If the apparatus determines that the current pointer has moved outside of the region covered by the data store, then the region locator pointer is moved so that the region covered by the data store moves. This ensures that it covers the region that is currently being accessed. When moving the region any of the locations in the data store that are not within the current updated region need to be invalidated as they will not contain relevant information.

In some embodiments, said data store updating circuitry is further responsive to receipt of an indication from said data store lookup circuitry that said updated current pointer is outside said region to initiate a tag RAM lookup to locate a way storing said value of said cache access request and to update said entry in said data store pointed to by said updated current pointer with an identifier identifying said way.

Following receipt of an indication that the current pointer is outside the region then a tag RAM lookup is required to locate the way that stores the value of the cache access. When this cache way has been found it can be used to access the data required and it can also be stored in the position pointed to by the current pointer in the data store. In this way, the data store is updated with information relating to addresses in a region that is currently being accessed.

In some embodiments, said data store comprises a circular buffer.

Using a circular buffer as the data store is particularly appropriate when used in conjunction with pointers pointing to locations within the data store. In this way, the current pointer and region locator pointer can simply comprise a number of bits sufficient to point to each location within the data store. Incrementing or decrementing them by the offset amount, in dependence upon whether the offset amount is a positive or negative value, means that they can be made to move around the circular buffer to point to a new location. If the current pointer moves too far then an additional bit can be used to indicate that it has gone completely around the circular buffer and this information is used when comparing its value to the region locator pointer to determine whether it is outside of the address range currently covered or not.

In some embodiments, said values comprise data items processed by said data processor, while in other embodiments, said values comprise instructions processed by said data processor.

Embodiments of the present invention are applicable to situations where cache access requests are to locations within a particular region. Thus, instruction accesses which are often sequential or within small loops benefit particularly well from embodiments of the present invention. Furthermore, certain data accesses which access consecutive locations or proximate locations in memory are also applicable to embodiments of the present invention.

In some embodiments, said offset determining circuitry comprises a comparator for comparing predetermined bits of a virtual address of said cache access request with said predetermined bits of a virtual address of said immediately preceding cache access request.

Although the offset determining circuitry can determine the offset in a number of ways, comparing predetermined bits of the virtual addresses of the access request can provide this information simply. Only a few of the bits of the address need to be compared because the data store is a limited size and it is only the relative position within the data store that is required by the current pointer. The complete virtual address is important for use in locating the actual data when moving outside of the region covered but as far as the accessing of the data store is concerned only a few number of bits need to be considered.

In some embodiments, said data processing apparatus comprises a prefetch unit that is responsive to detecting that a subsequent instruction to be fetched is located in a consecutive address to output a sequential indicator, said offset determining circuitry being responsive to said sequential indicator to increment said current pointer.

In many circumstances such as in the fetching of instructions the next cache access request will be to a subsequent address. This information is known by the prefetch unit and it may be advantageous for this information to be output such that the current pointer can simply be incremented in response to detecting this rather than a comparison of the bits of the virtual address being made.

In some embodiments, in response to accessing said data store and detecting an invalid indicator, said data processing apparatus updates said storage location and said valid bit by performing a tag RAM lookup.

In the case that the data store does not store information regarding the cache way of this particular cache access request then an invalid indicator is detected associated with the data store entry and in response to this a tag lookup can be performed and the cache way determined and the data store updated with this value.

A further aspect of the present invention provides a method of determining which of a plurality of cache ways a cache access request to a set associative cache is to access, comprising the steps of: in response to a cache access request determining an offset of an address of said cache access request to an immediately preceding cache access request; updating a current pointer pointing to a most recently accessed storage location in a data store by said offset amount, said data store comprising a plurality of storage locations for storing a plurality of identifiers, each identifier identifying a cache way that a corresponding value from said set associative cache is stored in and each having a valid indicator associated therewith, said plurality of identifiers corresponding to a plurality of values, said plurality of values being values stored in consecutive addresses such that said data store stores identifiers for values stored in a region of said memory; and determining from a size of said data store and said offset amount whether said updated current pointer is pointing to an address within said region; and if it is identifying said cache way from said stored identifier pointed to by said current pointer if it has a valid indicator associated with it.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
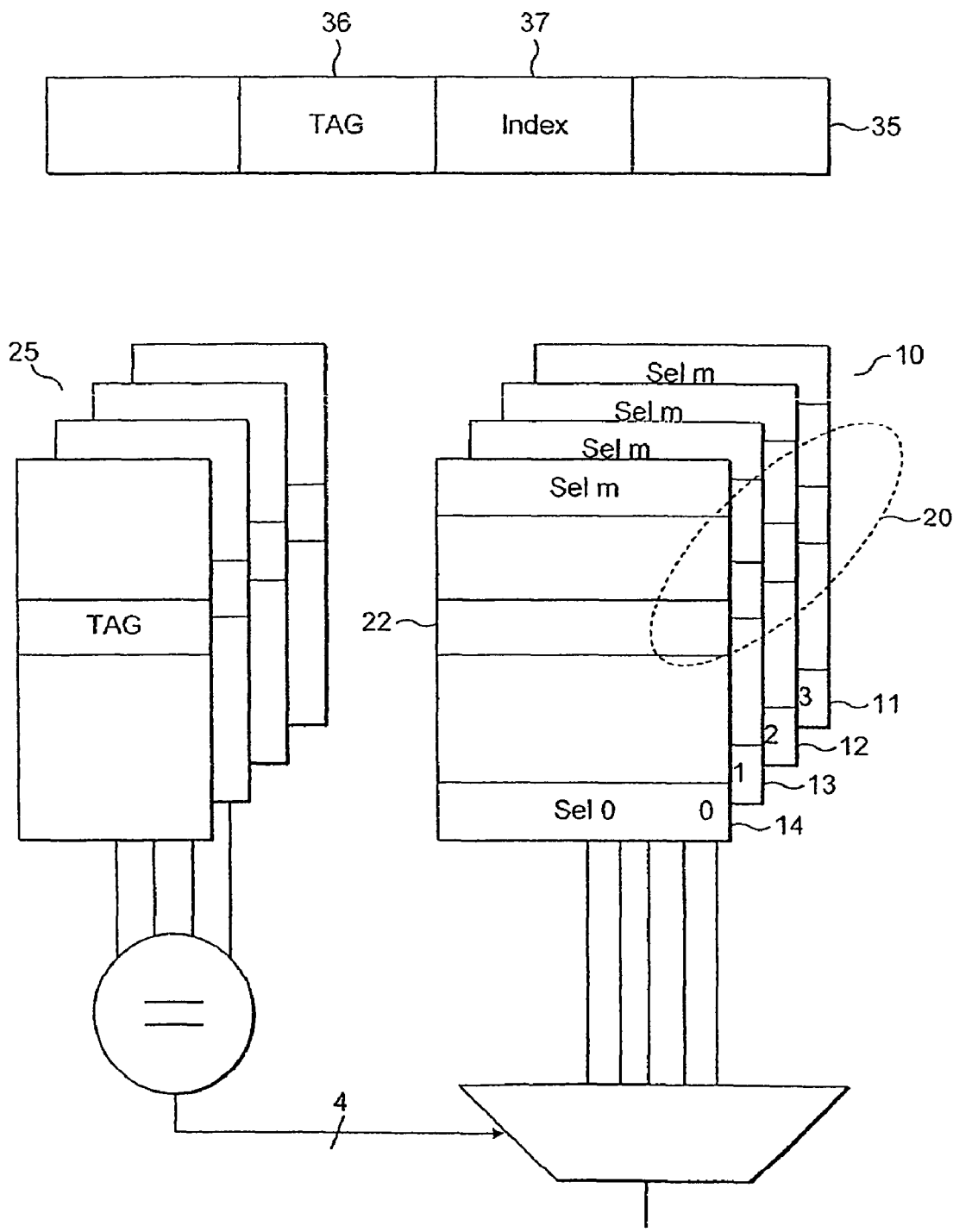
FIG. 1 schematically illustrates a 4-way set associative cache according to the prior art.
Figure 2:
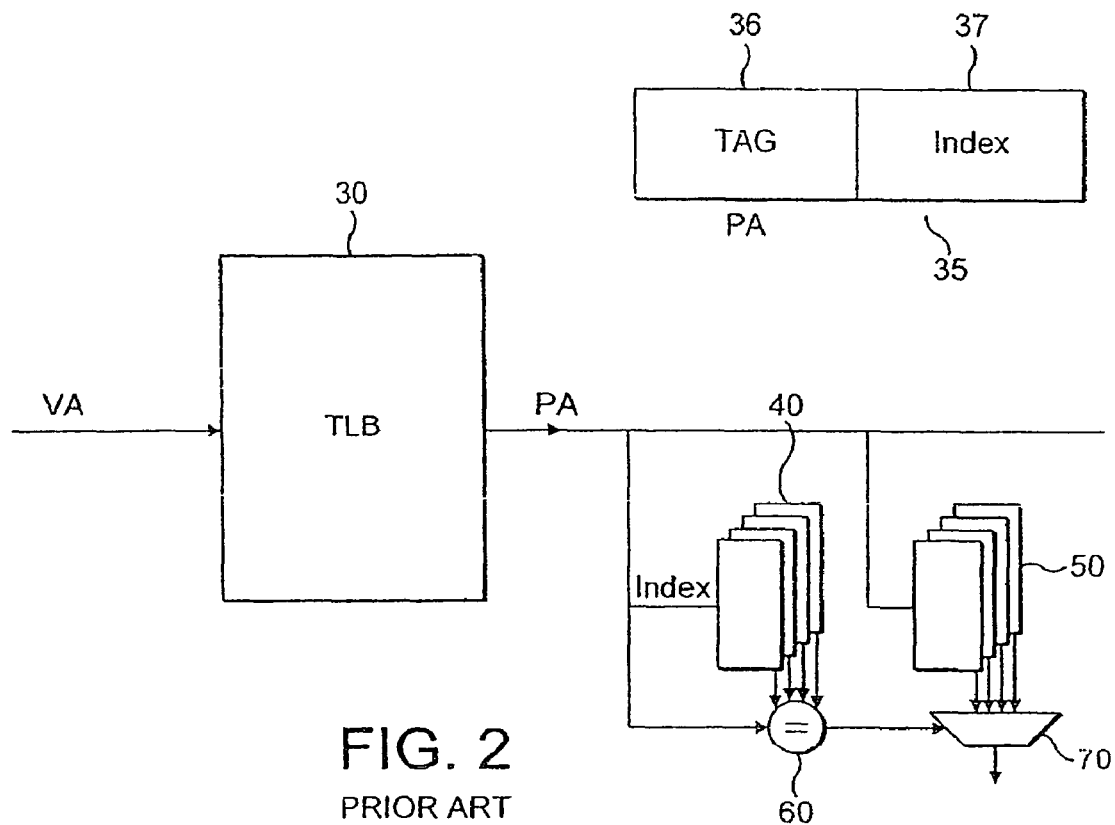
FIG. 2 schematically illustrates data access in a physically indexed/physically tagged cache system according to the prior art.
Figure 3:
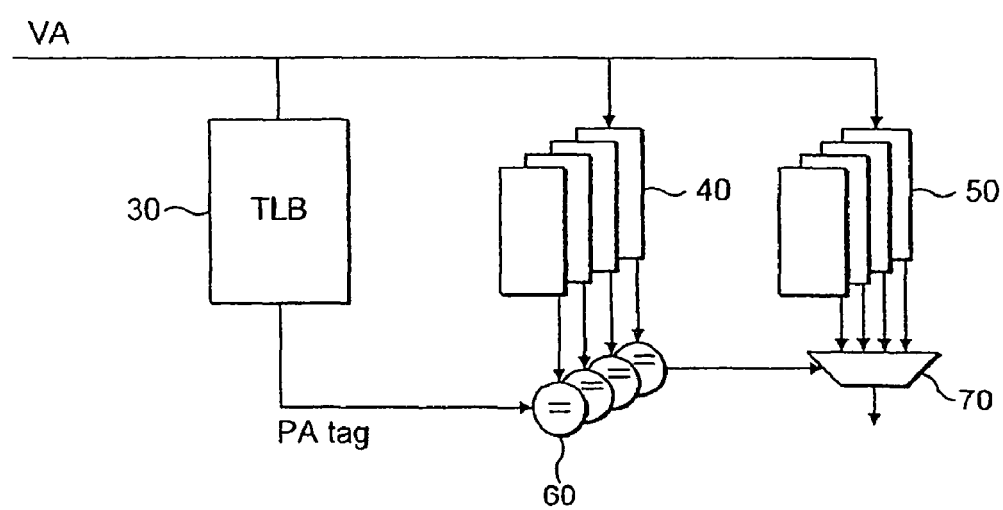
FIG. 3 shows a virtually indexed/physically tagged cache system according to the prior art.
Figure 4:
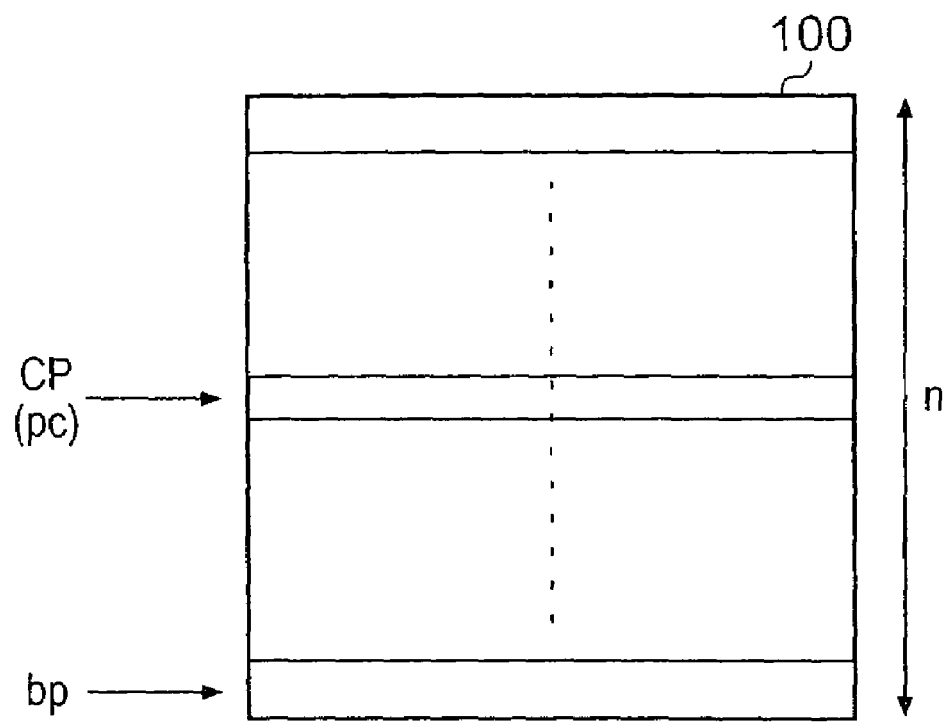
FIG. 4 shows a micro tag store and a corresponding portion of memory that it covers according to an embodiment of the present invention.
Figure 4:
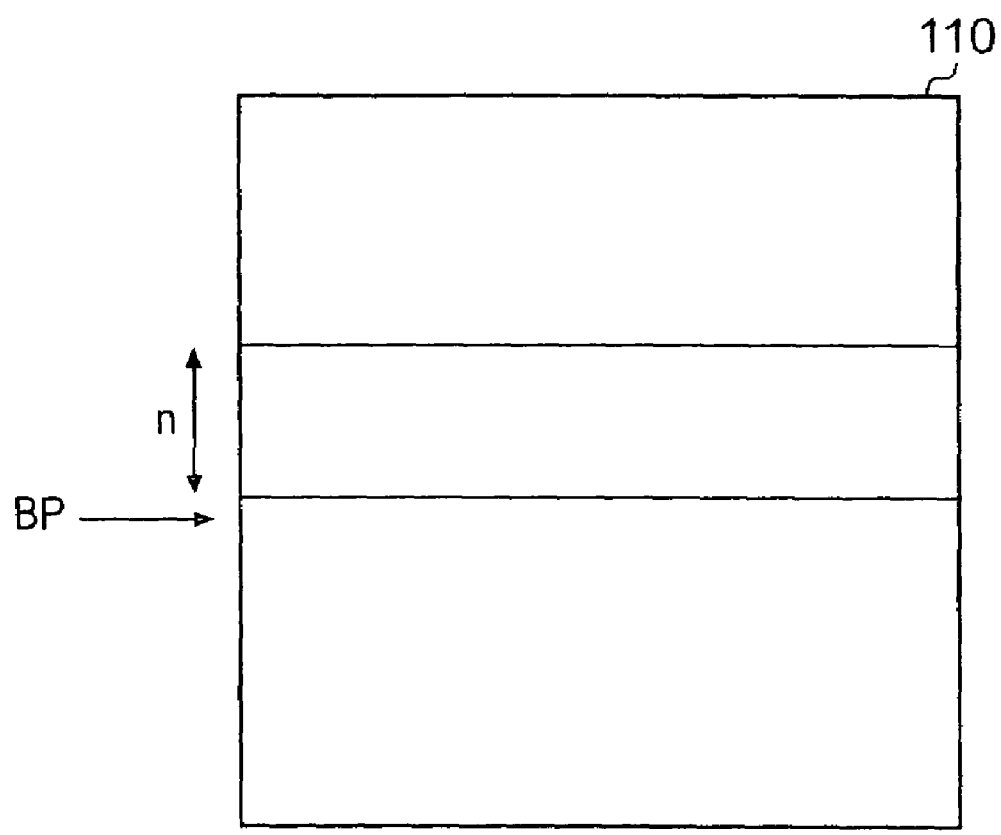

FIG. 4 shows microtag 100 which stores values indicating cache ways for a region of memory 110. Microtag 100 has n entries for storing n values indicating the cache ways for n consecutive addresses within memory 110 and comprises two pointers associated with it that point to two entries within microtag 100. One pointer is the bottom pointer which points to the lowest address covered by microtag 100 and the other is the current pointer which points to the location corresponding to the current cache access request being processed. In the case of an instruction cache this points to the same address as the program counter.

Figure 5:
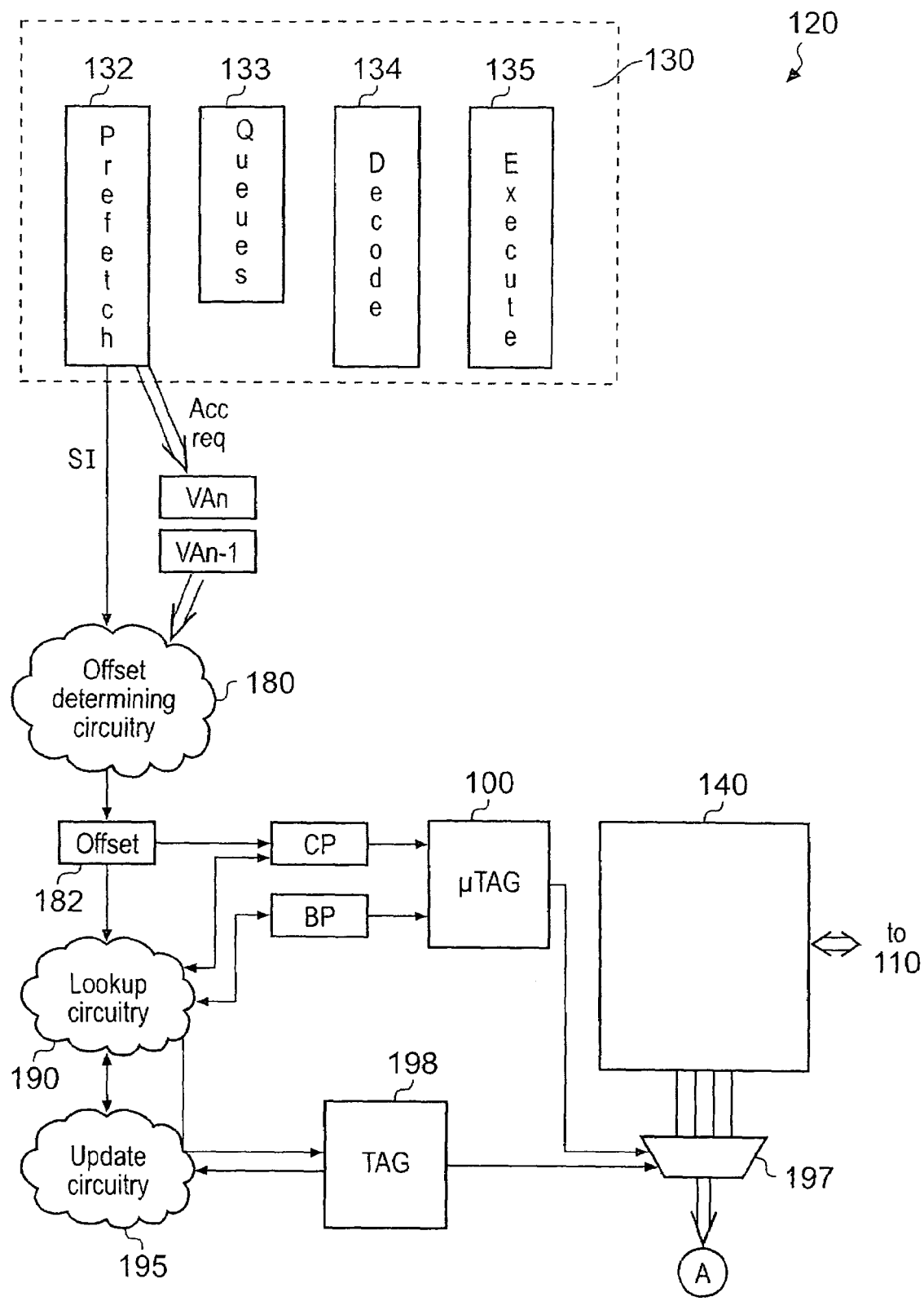
FIG. 5 shows a data processing apparatus according to an embodiment of the present invention.

FIG. 5 shows a data processing apparatus 120 according to an embodiment of the present invention. Data processing apparatus 120 comprises a processor 130, having a prefetch unit 132, instruction queues 133, decode section 134 and an execution section or sections 135. There is an instruction cache 140 that prefetch unit 132 fetches instructions from and a memory 110 (not shown) that instruction cache communicates with.

A cache access request is output from prefetch unit 132, if this cache access request is a sequential access request then, in this embodiment, a sequential indicator SI is also output by prefetch unit 132. If not it is simply the access request that is output. If no SI is output then a comparator in offset determining circuitry determines the offset of this access request to a previous access request by comparing certain relevant bits of their virtual addresses and determines from this, an offset which it then stores in offset store 182. In other embodiments there may be no provision for an SI to be output from the prefetch unit and in such embodiments the offset determining circuitry determines the offset for all cache access requests including sequential ones. This offset is then used to update the current pointer. If a sequential indicator SI is output then the current pointer is simply incremented. Lookup circuitry 190 then determines from a size of the data store and from the location of the bottom pointer whether or not the updated current pointer is within the region currently covered by the microtag 100. If it determines it is then lookup circuitry accesses a value from the microtag 100 pointed to by the updated current pointer and if it is marked as valid selects the way to be activated in the cache lookup. Multiplexer 197 then outputs the stored value from the selected way of the cache at A and this is retrieved by the prefetch unit and sent to the queues.

If it is marked as invalid then the update circuitry 195 initiates a tag lookup in the tag RAM 198 to determine in the conventional way from the tags which way the access request is stored in and the appropriate way is activated from the tag lookup. Multiplexer 197 then outputs the stored value from the selected way of the cache at A and this is retrieved by the prefetch unit and sent to the queues. The microtag storage location corresponding to this address is then updated using the update circuitry with this value and is marked as valid.

In the case that the lookup circuitry 190 determines that the current pointer is outside of the region covered by the microtag 100 then the update circuitry 195 updates the microtag 100 so that the region covered includes the current pointer by incrementing the bottom pointer by the offset amount. It should be noted that the offset that is determined is a signed value so that it can move the pointers in either direction. Details of how the microtag 100 is then updated and the bottom pointer moved is given with respect to the later figures.

Cache 140 is also connected to memory 110, such that if there is a miss in the cache in response to a cache access request, the line in the cache can be updated with a memory access to the appropriate address.

Figure 6:
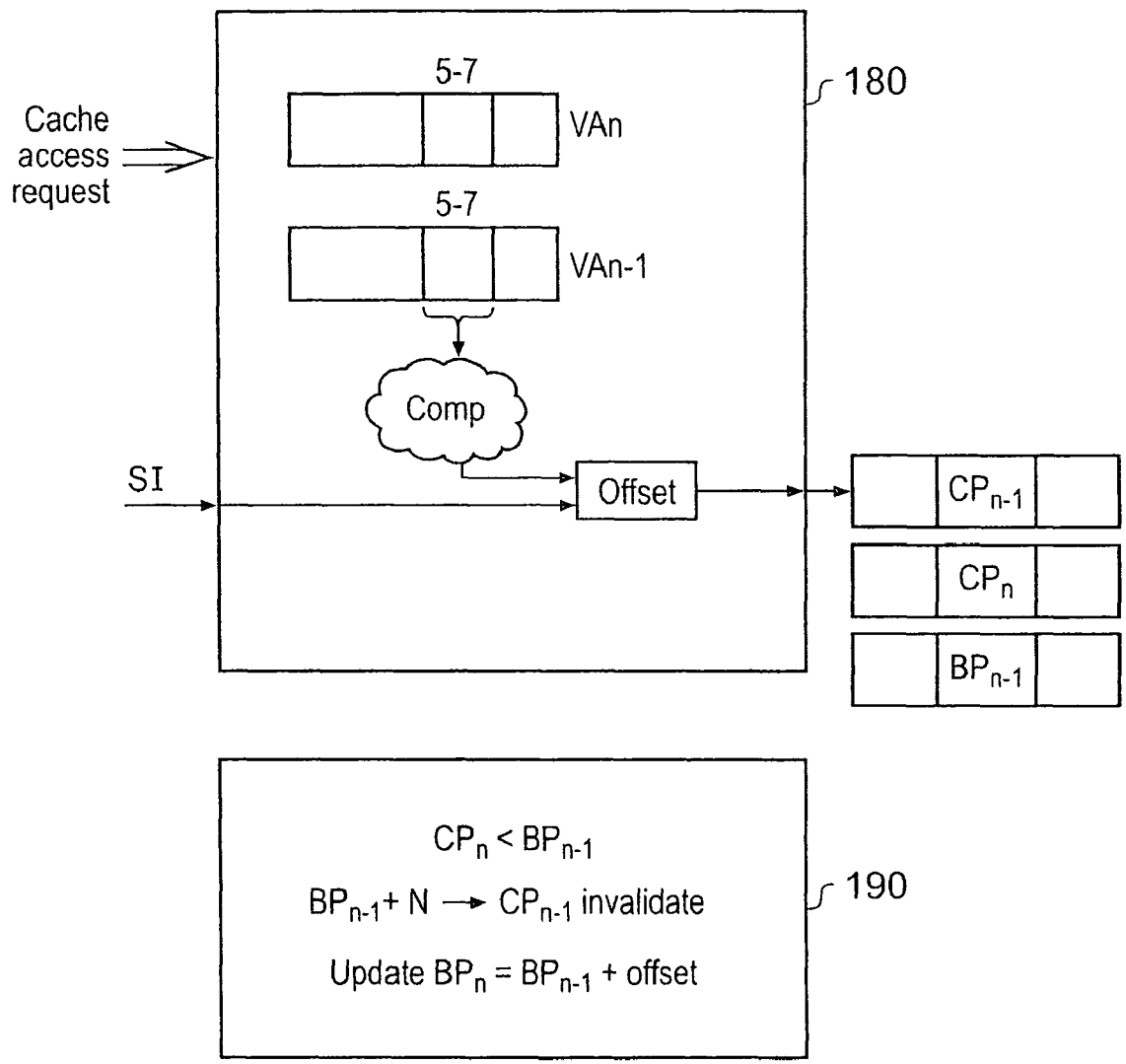
FIG. 6 shows offset determining circuitry and lookup circuitry according to an embodiment of the present invention.

FIG. 6 shows offset determining circuitry 180 in greater detail. In this circuitry a cache access request and possibly a sequential indicator are received. If there is no sequential indicator received then the appropriate bits, in this case bits 5 to 7, of the virtual address of the current access request are compared with the previous access request and from this comparison an offset value is produced and the current pointer is updated by that amount. If a sequential indicator is received then the offset is simply incremented and no comparison is performed. The value of the updated current pointer is then compared with the bottom pointer and the size of the data store by update circuitry 190 to determine if it is within region. If it is not within the region covered by the microtag then update circuitry 190 moves the bottom pointer by the offset and invalidates the storage location addresses that are now outside of the moved region. It should be noted that the bottom pointer simply needs to be updated so that the current pointer is within the region of interest. This would work by updating it by the offset. Alternatively, it could be updated to be the same value as the current pointer or in a different way.

Figure 7A:
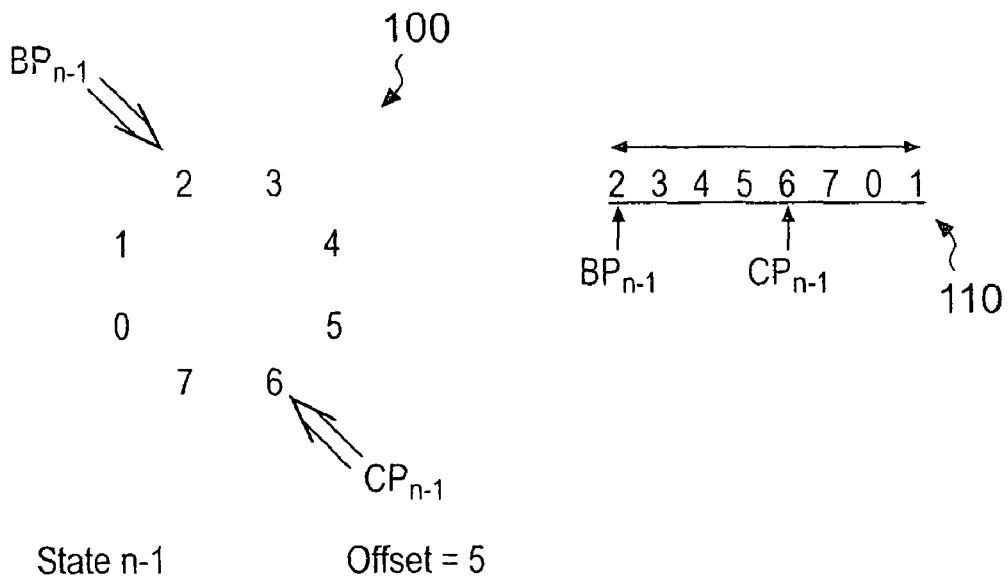
FIG. 7 schematically shows microtags according to an embodiment of the present invention.
Figure 7B:
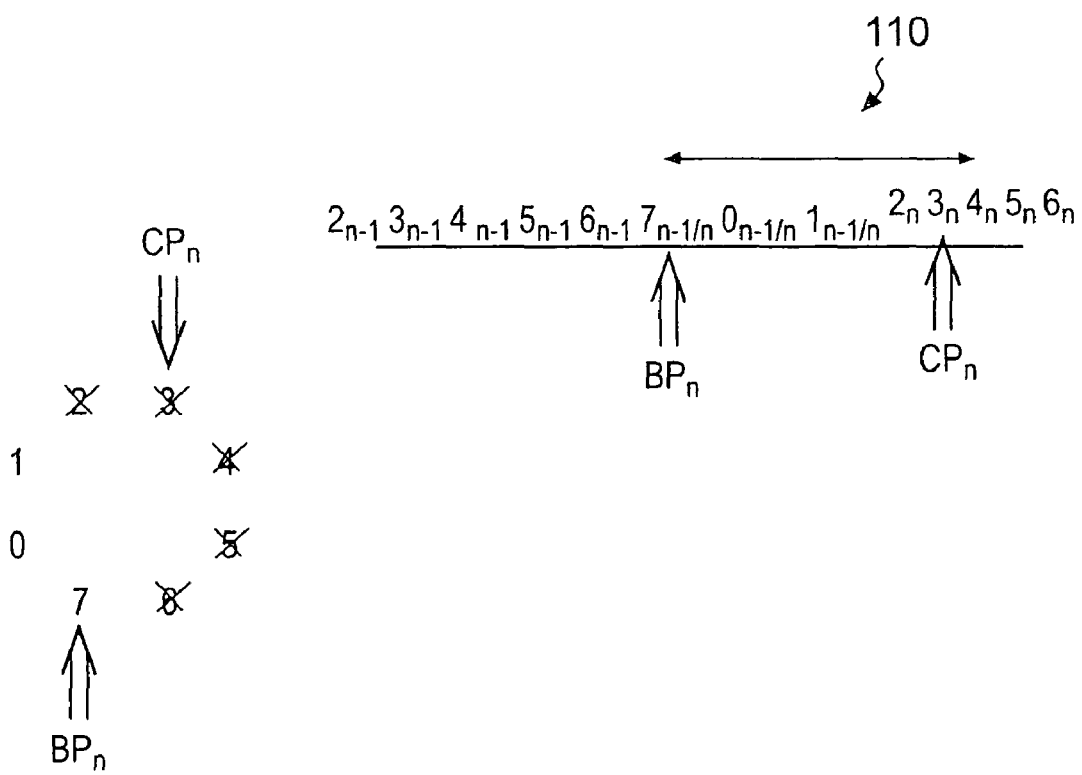

FIG. 7 shows in greater detail how such updating and invalidation is performed. In FIG. 7a microtag 100 is shown as a circular buffer having locations 0, 1, 2, 3, 4, 5, 6, 7 for storing entries. At present the bottom pointer is pointing to entry number 2. A corresponding portion of memory 110 is also shown so that the sequential addresses covered by the region are shown as corresponding to the storage locations of the circular buffer. A new cache access request (n) is received and it has an offset of 5 compared to the previous (n−1) value. Updating current pointer cpn-1 by 5 involves it passing the bottom pointer BPn−1 in the circular buffer and moving out of the region covered in the memory 110. FIG. 7b shows microtag 100 updated for the new request. CPn ends up point at entry 3 in the circular buffer that is microtag 100. The data store lookup circuitry determines from the offset value, position of the bottom pointer and the size of the microtag that the current pointer is now outside of the region and the update circuitry then updates the bottom pointer by the offset amount so that the bottom pointer now points to storage location 7 within the circular buffer that is microtag 100. The update circuitry then invalidates those positions within the circular data store that no longer store valid values. These are the positions that are now outside of the region previously covered, which are those that lie between the former bottom pointer (BPn−1)+n and the former current pointer (CPn−1). The update circuitry then performs a tag lookup to determine the way that the value currently being requested is stored in.

The result is used to activate the required way and is also used to update the location in the microtag 100 that is pointed to by the current pointer CPn. As can be seen storage locations 2, 3, 4, 5 and 6 are invalidated as they no longer store values within the region covered by the microtag 100. Although storage location 3 is updated following invalidation with the result of the tag RAM lookup and is then marked as valid. Storage locations 1, 0 and 7 remain valid and are not invalidated in this way. It should be noted that the algorithm used to calculate which locations are outside the region is the same whether the region moves a long way such that all locations are outside the region or whether it only moves a short way so that only some locations are outside of the region.

Figure 8:
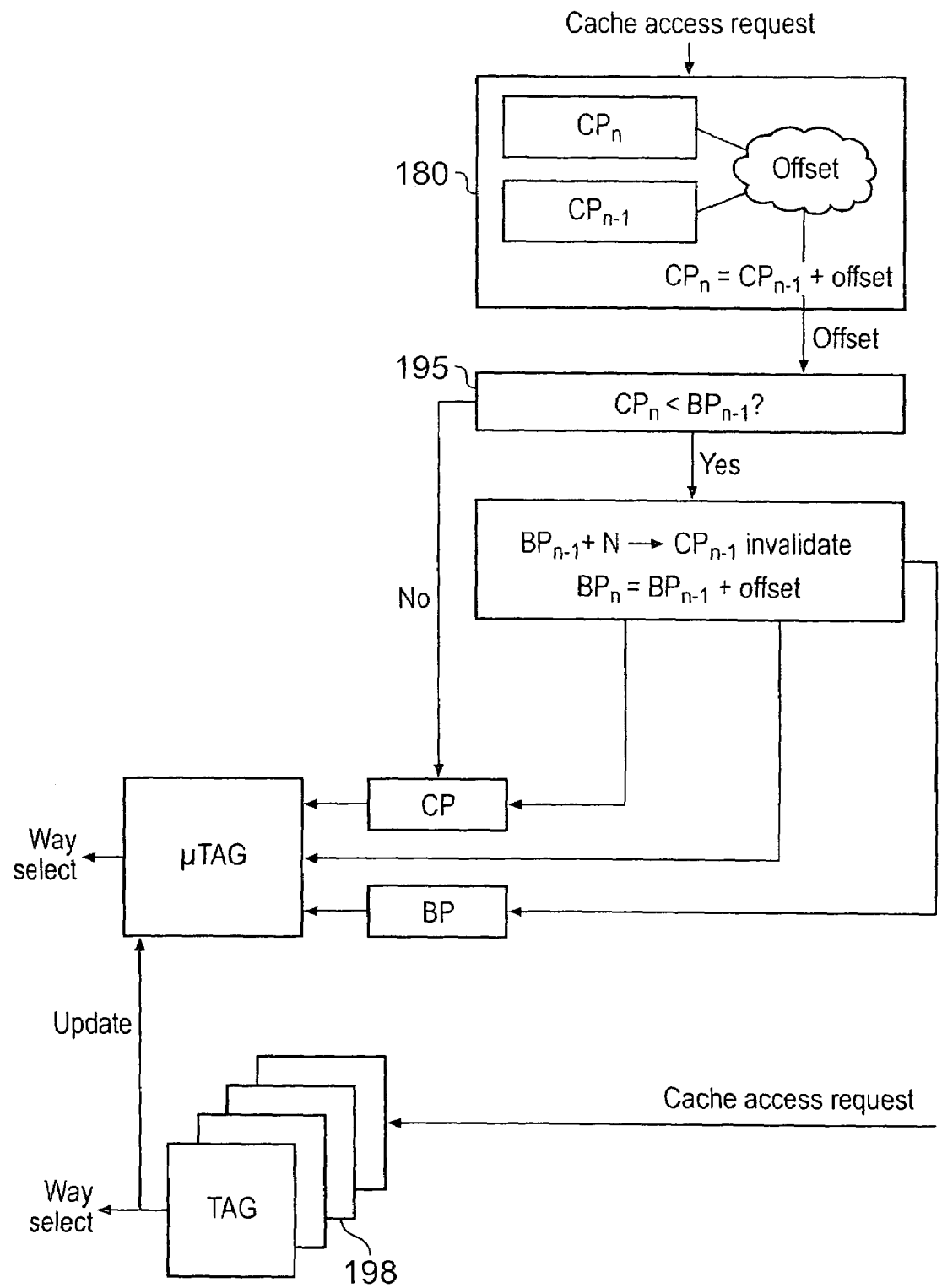
FIG. 8 schematically shows offset determining circuitry, data store lookup circuitry and update circuitry according to an embodiment of the present invention.

FIG. 8 shows the offset determining circuitry 180 and update circuitry 195 in greater detail. It also shows the TAG RAM 198 where a lookup is performed when no valid micro tag entry is found. As can be seen a cache access request is received and the offset is determined from this. This offset is then used along with knowledge of the data store size and the bottom pointer location to determine whether or not the current pointer is in the microtag. If it is then it is updated and the way read from the microtag if it is validly stored. If it is not validly stored then the way select is determined from a TAG RAM lookup and the microtag 100 is updated. If the current pointer is moving outside of the region then the bottom pointer is updated and the microtag is updated to correspond to the new region that it then covers.

Figure 9:
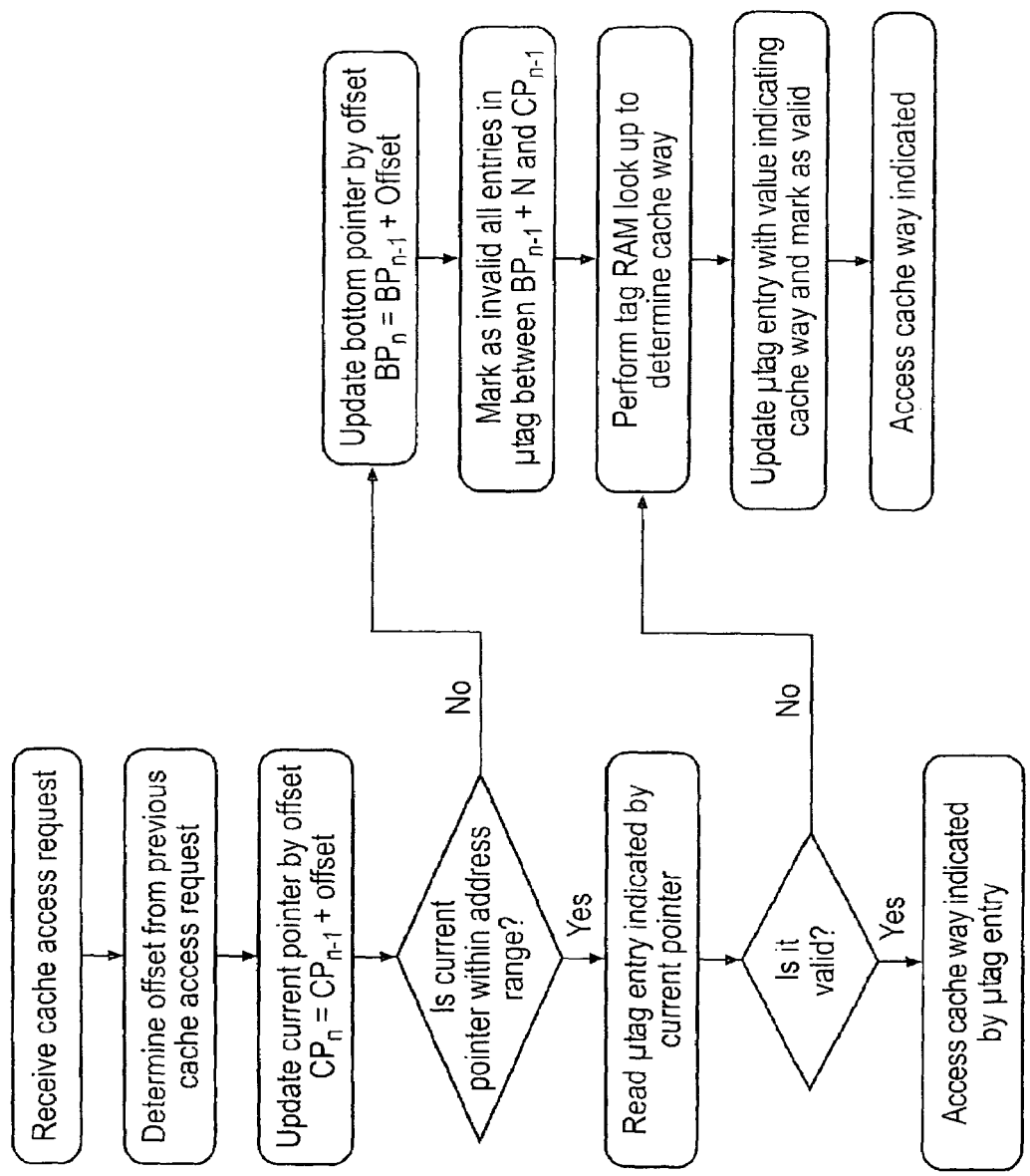
FIG. 9 shows a flow diagram illustrating steps in a method according to an embodiment of the present invention.

FIG. 9 shows a flow diagram illustrating steps of a method according to an embodiment of the present invention. In a first step a cache access request is received. An offset is determined from a previous cache access request and the received cache access request and the current pointer is updated by the offset. A determination is then performed as to whether or not the current pointer is within the address range covered by the microtag. If it is then the microtag entry pointed to by the current pointer is read and if it is valid then the cache way indicated by the value is selected and the value in the cache line is read. If it is not valid then a TAG RAM look up is performed to determine the cache way, this cache way is then selected and the microtag entry updated.

If it is determined that the current pointer is not within the address range then the bottom pointer is updated by the offset. Following this all entries in the micro tag between the former bottom pointer (BPn−1)+n and the former current pointer (CPn−1) are invalidated. Then a TAG RAM lookup is performed and it is determined which cache way to access. This cache way is then selected and the corresponding microtag entry is updated with this value and it is marked as valid.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. A data processing apparatus said data processing apparatus comprising:
   (i) at least one data processor for processing data;
   (ii) a set associative cache for storing values to be processed by said data processor, each value being identified by an address of a memory location within a memory storing said value, said set associative cache being divided into a plurality of cache ways;
   (iii) a data store comprising a plurality of storage locations for storing a plurality of identifiers, each identifier identifying a cache way that a corresponding value from said set associative cache is stored in and each having a valid indicator associated therewith, said plurality of identifiers corresponding to a plurality of values, said plurality of values being values stored in consecutive addresses such that said data store stores identifiers for values stored in a region of said memory;

(iv) a current pointer store for storing a current pointer pointing to a most recently accessed storage location in said data store;

(v) offset determining circuitry responsive to a cache access request to determine an offset of an address of said cache access request to an immediately preceding cache access request, said offset determining circuitry being adapted to update said current pointer by said offset amount; and (vi) data store lookup circuitry for determining from a size of said data store and said offset if said updated current pointer is pointing to an address within said region and if so said data processor is adapted to identify said cache way from said stored identifier pointed to by said current pointer if it has a valid indicator associated with it.

2. A data processing apparatus according to claim 1, said data processing apparatus further comprising:

(i) a region locator pointer store for storing a region locator pointer pointing to an entry in said data store corresponding to a predetermined position within said region of consecutive addresses; wherein (ii) said data store lookup circuitry is adapted to determine if said updated current pointer is pointing to an address within said region from a value of said current pointer relative to said region locator pointer.

3. A data processing apparatus according to any claim 2, wherein said region locator pointer points to a storage location in said data store corresponding to a value having a lowest address.

4. A data processing apparatus according to claim 2, wherein said data store lookup circuitry comprises a comparator for comparing said updated current pointer and said region locator pointer and for determining whether said updated current pointer is outside of said region in response to said comparison.

5. A data processing apparatus according to claim 2, said data processing apparatus further comprising a data store updating circuitry, said data store updating circuitry being responsive to receipt of an indication from said data store lookup circuitry that said updated current pointer is outside said region to update said region locator pointer by said offset amount such that said region is moved by said offset amount and to invalidate said storage locations corresponding to addresses no longer within said region.

6. A data processing apparatus according to claim 5, wherein said data store updating circuitry is further responsive to receipt of an indication from said data store lookup circuitry that said updated current pointer is outside said region to initiate a tag RAM lookup to locate a way storing said value of said cache access request and to update said entry in said data store pointed to by said updated current pointer with an identifier identifying said way.

7. A data processing apparatus according to claim 2 wherein said data store comprises a circular buffer.

8. A data processing apparatus according to claim 7, wherein said pointers comprise counters having a number of bits such that they can point to any of said storage locations within said data store.

9. A data processing apparatus according to claim 1, wherein said values comprise data items processed by said data processor.

10. A data processing apparatus, according to claim 1, wherein said values comprise data items processed by said data processor.

11. A data processing apparatus according to claim 1, wherein said offset determining circuitry comprises a comparator for comparing predetermined bits of a virtual address of said cache access request with said predetermined bits of a virtual address of said immediately preceding cache access request.

12. A data processing apparatus according to claim 1, comprising a prefetch unit associated with said set associative cache, said prefetch unit being responsive to detecting that a subsequent instruction to be fetched is located in a consecutive address to output a sequential indicator, said offset determining circuitry being responsive to said sequential indicator to increment said current pointer.

13. A data processing apparatus according to claim 1, wherein in response to accessing said data store and detecting an invalid indicator, said data processing apparatus updates said storage location and said valid bit by performing a tag RAM lookup.

14. A data processing apparatus according to claim 1 wherein said data store comprises a micro tag.

15. A method of determining which of a plurality of cache ways a cache access request to a set associative cache is to access, comprising the steps of:

(i) in response to a cache access request determining an offset of an address of said cache access request to an immediately preceding cache access request;

(ii) updating a current pointer pointing to a most recently accessed storage location in a data store by said offset amount, said data store comprising a plurality of storage locations for storing a plurality of identifiers, each identifier identifying a cache way that a corresponding value from said set associative cache is stored in and each having a valid indicator associated therewith, said plurality of identifiers corresponding to a plurality of values, said plurality of values being values stored in consecutive addresses such that said data store stores identifiers for values stored in a region of said memory; and (iii) determining from a size of said data store and said offset amount whether said updated current pointer is pointing to an address within said region; and (iv) if it is identifying said cache way from said stored identifier pointed to by said current pointer if it has a valid indicator associated with it.

16. A method according to claim 15, wherein said step of determining whether said updated current pointer is pointing to an address within said region comprises comparing relative positions of a region locator pointer pointing to an entry in said data store corresponding to a predetermined position within said region of consecutive addresses with said updated current pointer.

17. A method according to claim 16, wherein said method comprising a further step of in response to said determining step determining that said updated current pointer is outside said region updating said region locator pointer by said offset amount such that said region is moved by said offset amount and invalidating said storage locations corresponding to addresses no longer within said region.

18. A method according to claim 17, said method comprising a further step of following invalidating said storage locations corresponding to addresses no longer within said region initiating a tag RAM lookup to locate a way storing said value of said cache access request and updating said entry in said data store pointed to by said updated current pointer with an identifier identifying said way.

19. A method according to claim 15, wherein said step of determining an offset of an address of said cache access request to an immediately preceding cache access request comprises comparing predetermined bits of a virtual address of said cache access request with said predetermined bits of a virtual address of said immediately preceding cache access request.

20. A method according to claim 15, wherein said step of determining an offset of an address of said cache access request to an immediately preceding cache access request comprises detecting a sequential indicator output by a prefetch unit and indicating that a subsequent instruction to be fetched is located in a consecutive address, said step of updating said current pointer comprising incrementing it in response to detection of said sequential indicator.

* * * * *